United States Patent
Chuang

(10) Patent No.: US 7,326,335 B2
(45) Date of Patent: Feb. 5, 2008

(54) APPARATUS FOR REMOVING SOLIDS FROM WATER IN CANAL

(75) Inventor: Hsu-Chen Chuang, Shindian (TW)

(73) Assignee: Taiwan Water & Soil Instrumentation, Inc. (TW)

(*) Notice: Subject to any disclaimer, the term of this patent is extended or adjusted under 35 U.S.C. 154(b) by 77 days.

(21) Appl. No.: 11/265,462

(22) Filed: Nov. 2, 2005

(65) Prior Publication Data

US 2007/0095730 A1    May 3, 2007

(51) Int. Cl.
*E03F 5/14* (2006.01)

(52) U.S. Cl. ............... 210/155; 210/158; 210/159; 210/160; 210/170.1; 210/328; 210/330; 210/332; 210/400

(58) Field of Classification Search ............... 210/155, 210/158, 159, 160, 170.1, 324, 328, 330, 210/332, 333.01, 391, 400
See application file for complete search history.

(56) References Cited

U.S. PATENT DOCUMENTS

| | | | | |
|---|---|---|---|---|
| 1,194,250 A | * | 8/1916 | Smits | 210/158 |
| 1,606,546 A | * | 11/1926 | Wallene | 210/160 |
| 1,864,359 A | * | 6/1932 | Laughlin et al. | 210/160 |
| 1,922,442 A | * | 8/1933 | Knight | 210/155 |
| 2,095,504 A | * | 10/1937 | Kesti et al. | 210/160 |
| 3,856,678 A | * | 12/1974 | Hagihara | 210/160 |
| 5,326,460 A | * | 7/1994 | Cheesman et al. | 210/160 |
| 6,187,184 B1 | * | 2/2001 | Reetz et al. | 210/155 |
| 6,251,268 B1 | * | 6/2001 | Holmberg | 210/155 |
| 6,719,898 B1 | * | 4/2004 | Marzluf | 210/158 |
| 7,125,486 B1 | * | 10/2006 | Chuang | 210/155 |

\* cited by examiner

*Primary Examiner*—Christopher Upton

(57) ABSTRACT

There is disclosed an apparatus for removing solids from water in a canal during or immediately after a rainstorm. The apparatus includes a plurality of filters and a carrier. The filters filter the solids from the water while moving in and taking impact from the water. The carrier carries the filters in a cycle.

13 Claims, 6 Drawing Sheets

APPARATUS FOR REMOVING SOLIDS FROM WATER IN CANAL

BACKGROUND OF INVENTION

1. Field of Invention

The present invention relates to an apparatus for removing solids from water in a canal in emergency such as during or immediately after a rainstorm when the water is too turbid for a waterworks to process.

2. Related Prior Art

In or immediately after a typhoon or rainstorm, tons of rocks and sand are washed to rivers and reservoirs so that water bodies used as water sources become gravely turbid. Time is often not enough for the gravely turbid water to deposit before it reaches a water treatment plant through a canal. In the water treatment plant, the gravely turbid water contains too many solids for normal equipment to treat and causes the normal equipment to malfunction. In the worst case, the water treatment plant has to be shut down.

There have been various devices for removing solids from water in a canal. However, the conventional devices include screws and motors for driving the screws. It requires a lot of energy to operate each of the foregoing conventional devices. The energy is generally provided in the form of electricity. In a blackout of the electricity system or failure of the motors, the devices will be shut down and block the stream. This could be even worse than the solids could do. The conventional devices can be seen in U.S. Pat. Nos. 4,836,919, 5,110,461, 5,296,136, 5,372,713, 5,552,044, 5,593,597, 5,798,038 and 6,733,663 for example.

The present invention is therefore intended to obviate or at least alleviate the problems encountered in prior art.

SUMMARY OF INVENTION

The primary objective of the present invention is to provide an apparatus for removing solids from water in a canal while consuming little energy more than the water can provide.

According to the present invention, there is provided an apparatus for removing solids from water in a canal. The apparatus includes a plurality of filters and a carrier. The filters filter the solids from the water while moving in and taking impact from the water. The carrier carries the filters in a cycle.

Other objects, advantages and novel features of the present invention will become apparent from the following detailed description referring to the attached drawings.

BRIEF DESCRIPTION OF DRAWINGS

The present invention will be described through detailed illustration of two embodiments referring to the drawings.

DETAILED DESCRIPTION OF EMBODIMENTS

Figure 1:
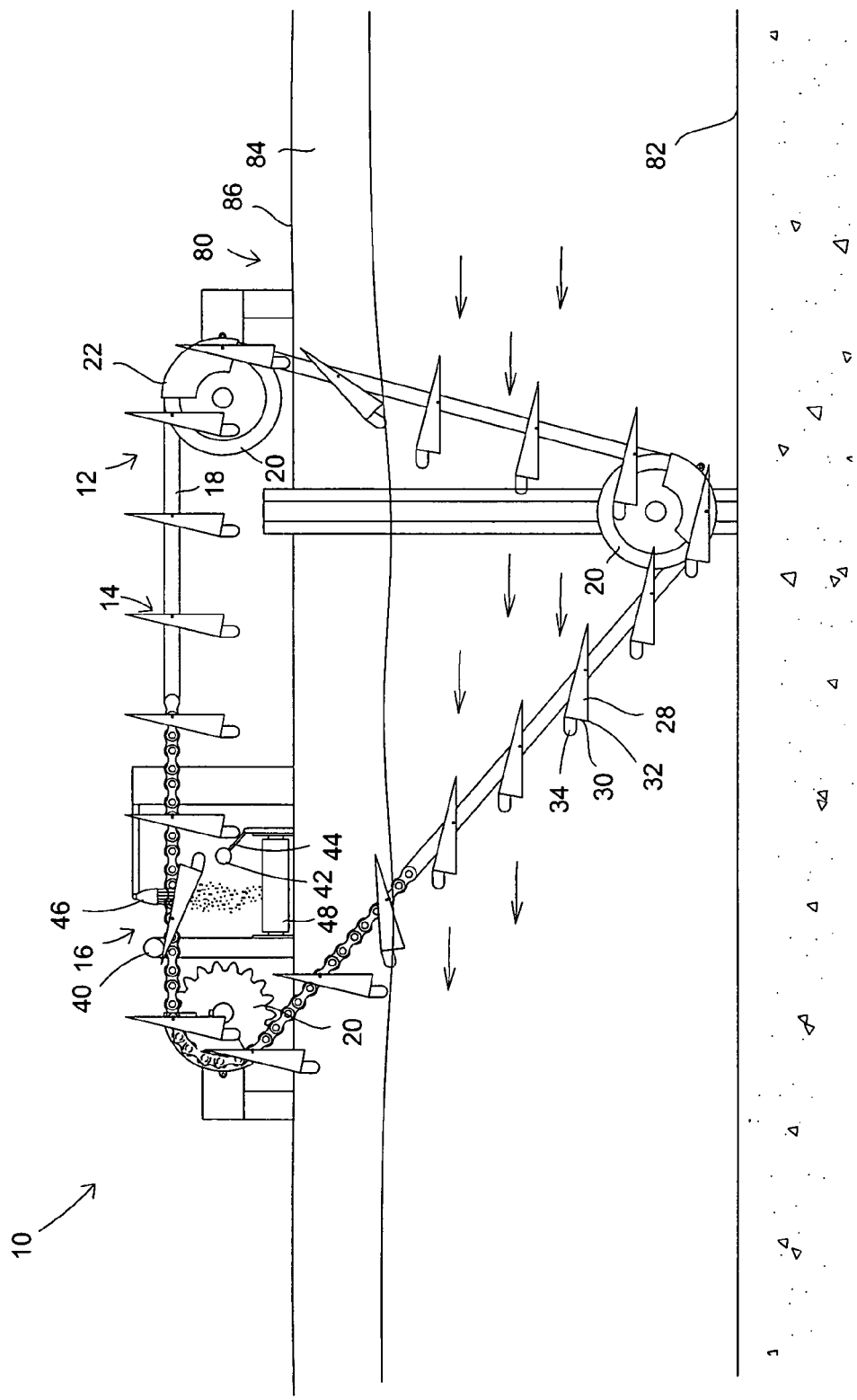
FIG. 1 is a side view of an apparatus for removing solids from water in a canal according to the first embodiment of the present invention.

Referring to the drawings, there will be described two embodiments of the present invention, an apparatus for removing solids from water in a canal 80. The canal 80 is in communication with a waterworks so that the water and solids travel to the waterworks through the canal 80. The apparatus is used in emergency such as during or immediately after a rainstorm when the water is too turbid for the waterworks to process.

Figure 5:
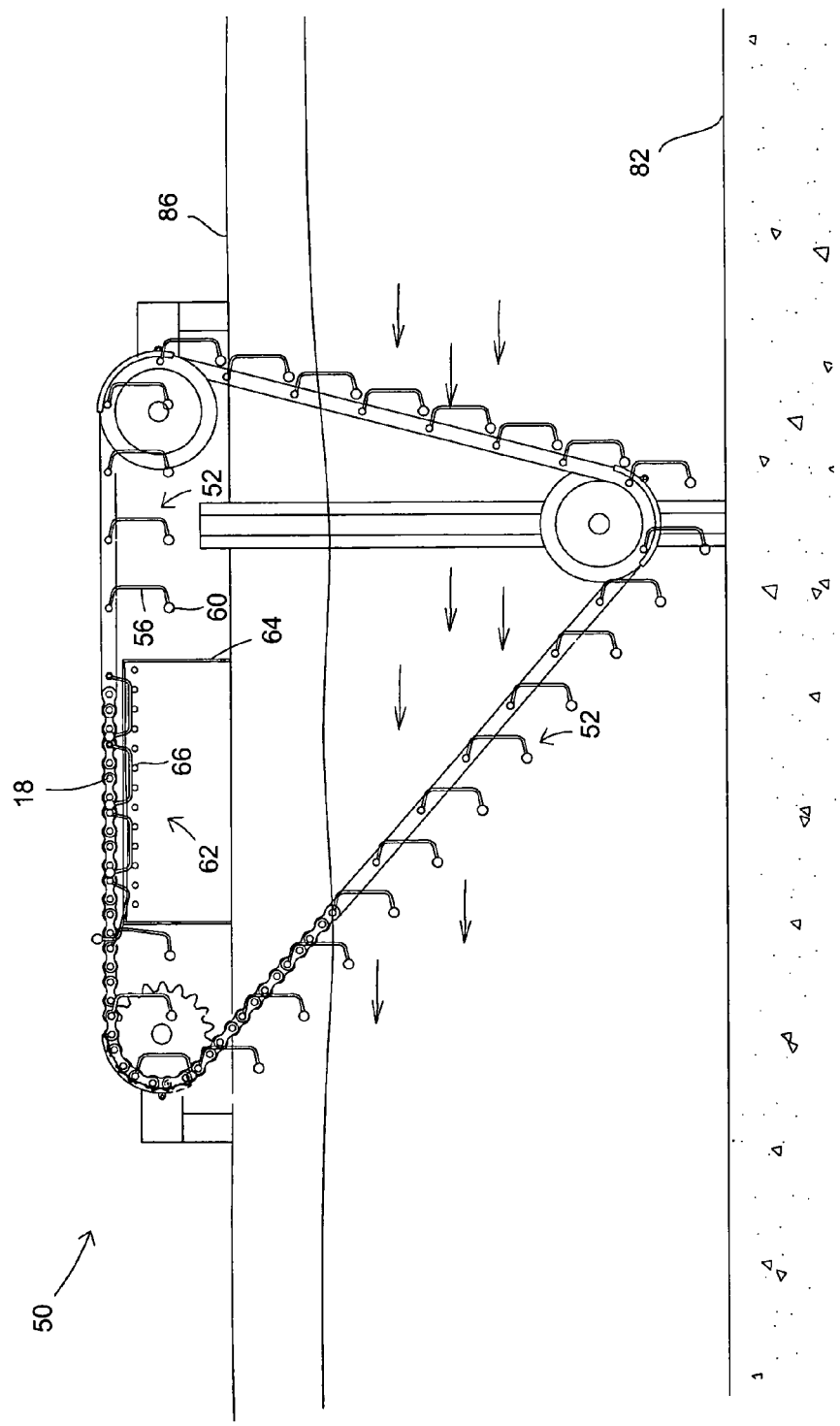
FIG. 5 is a side view of an apparatus for removing solids from water in a canal according to the second embodiment of the present invention.
Figure 6:
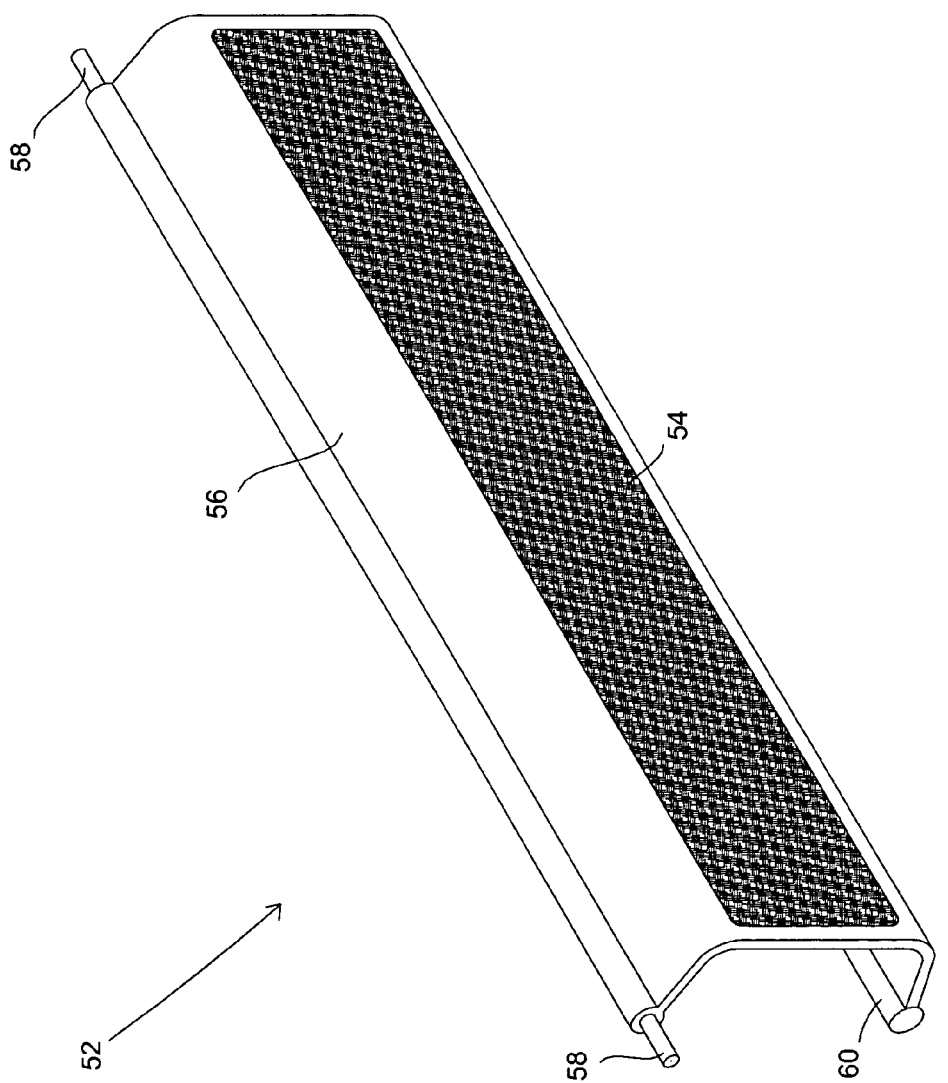
FIG. 6 is a side view of a filter shown in FIG. 5.

Referring to FIGS. 1 through 4, there is an apparatus 10 for removing large solids from water in a canal 80 according to the first embodiment of the present invention. Referring to FIGS. 5 and 6, there is an apparatus 50 for removing small solids from the water in the canal 80 according to the second embodiment of the present invention.

The term "large solids" means large solids descending fast while traveling with the water in the canal 80. The term "small solids" means small solids traveling substantially horizontally with the water in the canal 80. The canal 80 is formed with a floor 82, two walls 84 and two banks 86.

Figure 2:
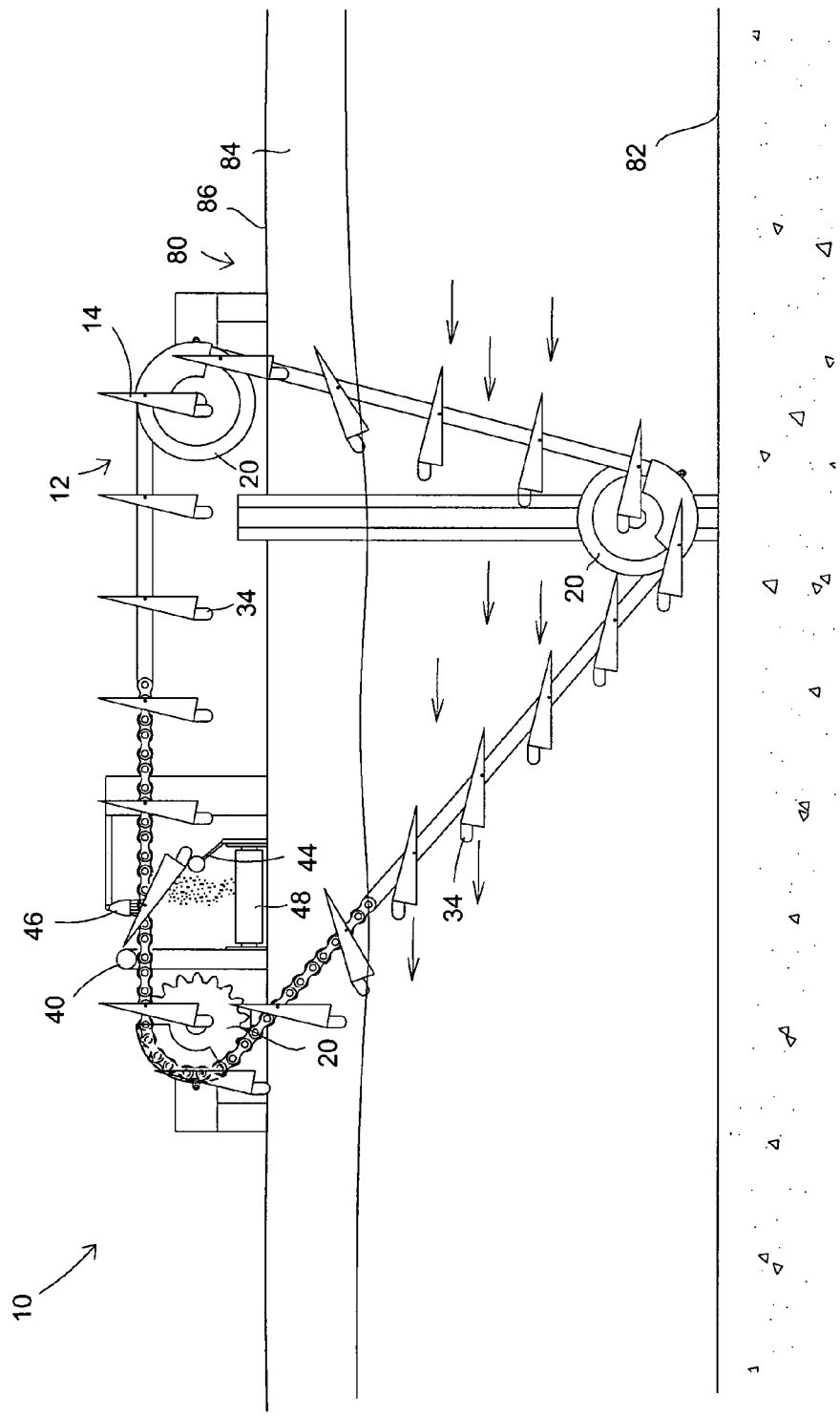
FIG. 2 is similar to FIG. 1 but shows filters in different positions.
Figure 3:
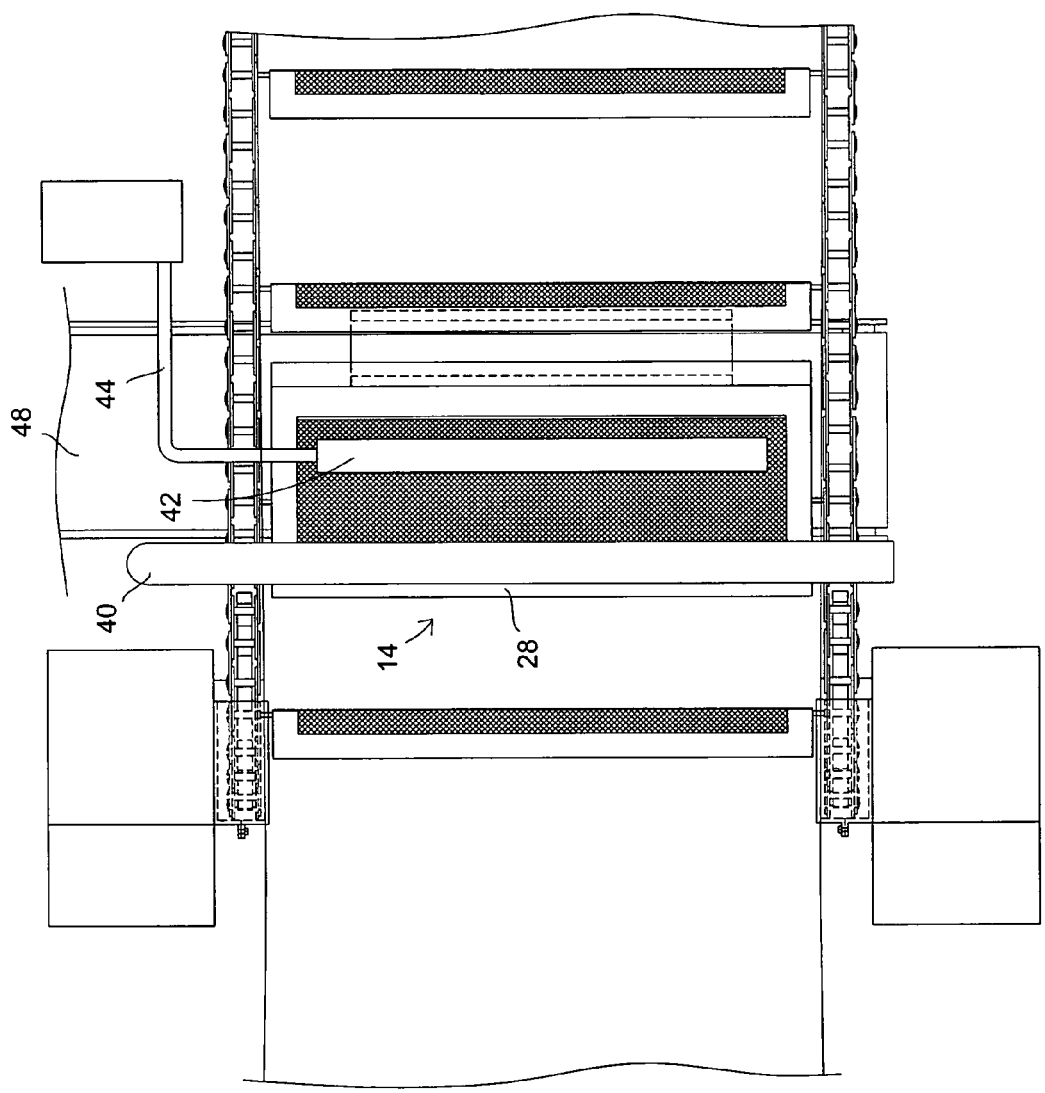
FIG. 3 is a partial top view of the apparatus shown in FIG. 1.

Referring to FIGS. 1 through 3, the apparatus 10 includes a carrier 12, a plurality of filters 14 carried on the carrier 12 in order to filter some of the large solids from the water in the canal 80 and a dumping device 16 for dumping the filtered large solids from the filters 14.

The carrier 12 includes two identical sets each including a chain 18 for carrying the filters 14 and three sprockets 20 in engagement with the chain 18. The sprockets 20 include an upstream surface sprocket 20 installed on one of the banks 86 of the canal 80, a submarine sprocket 20 installed on one of the walls 84 of the canal 80 near the floor 82 and a downstream surface sprocket 20 installed on the same bank 86 of the canal 80. It requires little energy more than the water can provide to operate the apparatus. Should other energy be required, a motor could be connected to one of the surface sprockets 20.

The chain 18 includes an upstream submarine section between the upstream surface sprocket 20 and the submarine sprocket 20, a downstream submarine section between the submarine sprocket 20 and the downstream surface sprocket 20 and a surface section between the downstream surface sprocket 20 and the upstream surface sprocket 20. Near each of the sprockets 20 is installed a cover 22 in order to prevent the chain 18 from derailing.

Although not shown, there may be an axle for connecting one of the sprockets of one of the sets to related one of the sprockets 20 of the remaining set in order to ensure that the sets operate synchronously.

Figure 4:
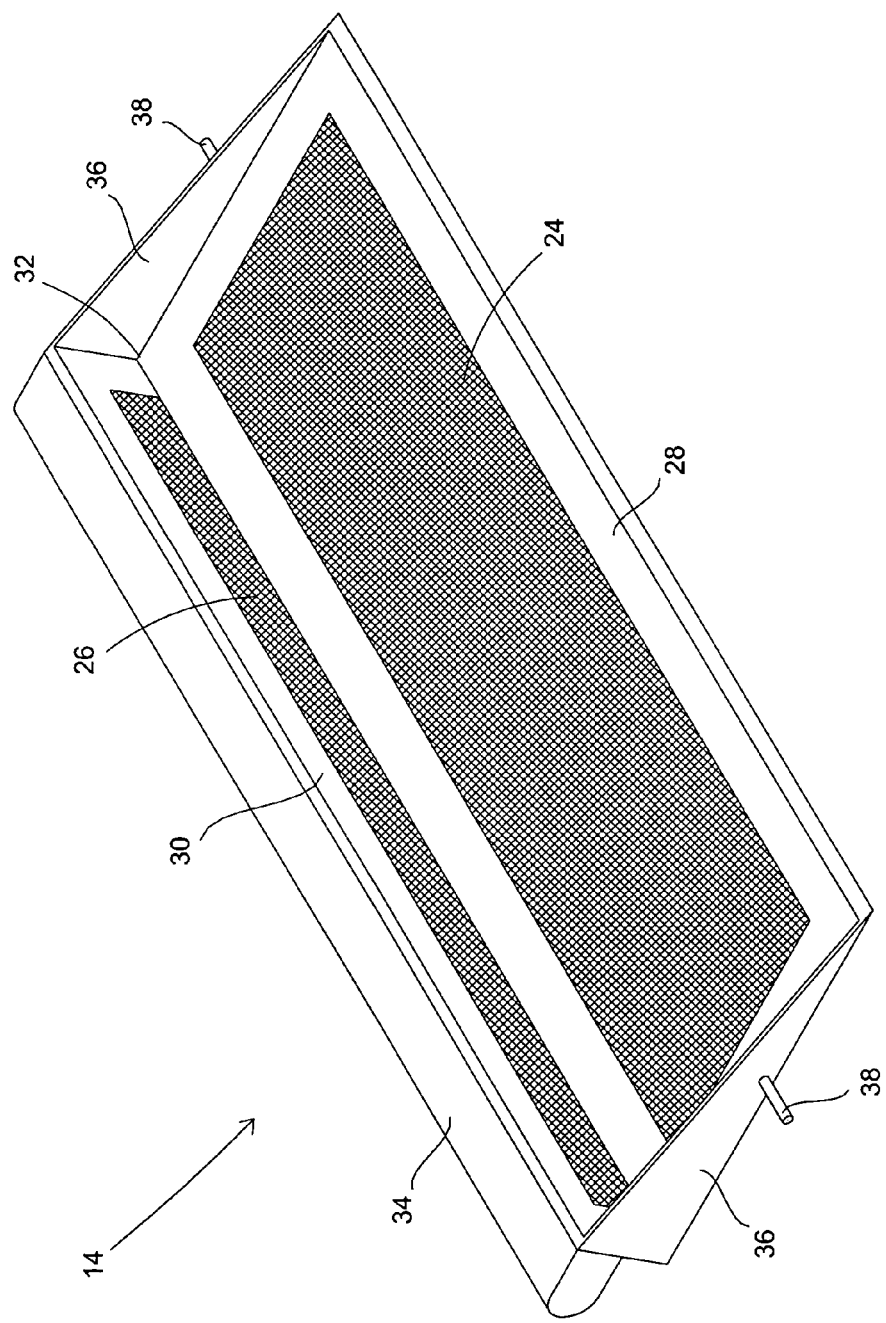
FIG. 4 is a perspective view of a filter shown in FIG. 1.

Referring to FIG. 4, each of the filters 14 looks like a dustpan in order to receive the large solids that descend fast while traveling with the water in the canal 80. Each of the filters 14 includes a primary filtering portion 28, a secondary filtering portion 30 on the primary filtering portion 28 so that an acute corner 32 exists between them, a buoy 34 on the secondary filtering portion 30, two walls 36 between the primary filtering portion 28 and the secondary filtering portion 30 and two pins 38 each on one of the walls 36.

The primary filtering portion 28 includes a screen 24 for filtering the large solids and a frame (not numbered) for supporting the screen 24.

The secondary filtering portion 30 includes a screen 26 for filtering the large solids and a frame (not numbered) for supporting the screen 26. The screens 24 and 26 are identical to each other except their sizes.

The buoy 34 is attached to or formed on a downstream surface of the frame of the secondary filtering portion 30.

The pins 38 are inserted in the chains 18 rotationally. The pins 38 are located on the walls 36 so that the primary filtering portion 28 will be substantially vertical when a filter 14 is completely out of the water. When a filter 14 is in the water, the primary filtering portion 28 will be substantially horizontal.

Preferably, the upstream submarine section of the chain 18 is vertical, and the downstream submarine section of the chain 18 horizontal. In practice, the upstream submarine section of the chain 18 is however at a small angle from vertical, and the downstream submarine section of the chain 18 at a small angle from horizontal. The reasons for doing so will be described.

The dumping device 16 includes a rod 40 near the downstream surface sprocket 20, a ram 42 on an elastic beam 44 near the rod 40, a nozzle 46 between the rod 40 and the ram 42 and a conveyor 48 on one of the banks 86 of the canal 80 between the rod 40 and the ram 42.

In the upstream submarine sections of the chains 18, the primary filtering portion 28 of almost every filter 14 is horizontal. As the upstream submarine sections of the chains 18 are substantially vertical, almost all of the filters 14 are above one another. As the upstream submarine sections of the chains 18 are short, only a few filters 14 exist here and interfere the water.

In the downstream submarine sections of the chains 18, the primary filtering portion 28 of almost every filter 14 is horizontal. As the upstream submarine sections of the chains 18 are substantially horizontal, almost no filter 14 is above another filter 14. In other words, no filter 14 interferes with another filter 14 regarding the filtering. The downstream submarine sections of the chains 18 are long so that many filters 14 exist here for filtering the solids.

The water and the large solids impinge the secondary filtering portion 30 of a filter 14 so that the screen 26 filters the large solids and that the filter 14 moves. The filter 14 moves a little bit slower than the water. The secondary filtering portion 30 causes a retro-stream in a proximal region, and this retro-stream causes the large solids to slow down. Hence, the movement of the large solids relative to the primary filtering portion 28 is vertical substantially. The screen 24 intercepts the large solids at the right angle. The secondary filtering portion 30 can intercepts a little portion of the large solids.

While leaving the water, a filter 14 is tilting. Out of the water, the filter 14 is substantially vertical. The acute angle 32 detains the solids. While contacting the rod 40, the filter 14 is pivoting for dumping the large solids. When about to leave the rod 40, the filter 14 is upside down in order to dump the large solids faster. The nozzle 46 sprays air or water through the screen 24 in order to force the large solids down to the conveyor 48. After leaving the rod 40, the filter 14 further pivots and finally impinges the ram 42. Thus, further large solids drop from the filter 14. Then, the filter 14 is carried from the ram 42.

Referring to FIGS. 5 and 6, the apparatus 50 is like the apparatus 10 except including filters 52 instead of the filters 14 and substituting a washing device 62 for the dumping device 16.

Each of the filters 52 includes a fabric 54 for filtering the small solids and a frame 56 for supporting the fabric 54. The fabric 54 may be Cloth Media® provided by Aqua. As the water travel through the fabric 54, the small solids encounter and adhere to the fabric 54. The frame 56 includes a middle portion, an upper portion extended from a downstream surface of the middle portion at an angle and a lower portion extended from the downstream surface of the middle portion at an angle. The fabric 54 is supported on the middle portion of the frame 56. Two pins 58 are formed on the upper portion of the frame 56. A weight 60 is formed on the lower portion of the frame 56.

The pins 58 are inserted in the chains 18 so that the filter 52 is connected to the chains 18 rotationally. Since the weight 60 is provided on the downstream surface of the middle portion of the frame 56, the fabric 54 supported on the middle portion of the frame 56 will pivot upstream when out of the water. The fabric 54 will become vertical when impinged by the water. Thus, the fabric 54 will intercept the small solids at the right angle.

The washing device 62 includes a tank 64 filled with water and rods 66 provided in the tank 64. Ultrasonic waves or suction can be used in the tank 64 in order to remove the small solids from the fabric 54 quickly.

The present invention has been described through the illustration of the embodiments. Those skilled in the art can derive variations from the embodiments without departing from the scope of the present invention. Hence, the embodiments shall not limit the scope of the present invention defined in the claims.

What is claimed is:

1. An apparatus for removing solids from water in a canal (80), the apparatus comprising:
    a plurality of filters (14; 52) each comprising:
        a primary filtering portion (28) for filtering the solids while traveling in the water;
        a second filtering portion (30) on the primary filtering portion (28) in order to filter the solids and take impact from the water while traveling in the water;
        an acute corner (32) between the primary filtering portion (28) and the secondary filter portion (30) in order to detain the solids while traveling; and a wall (36) on each side of the filter
        in order to restrain the solids; and
    a carrier (12) comprising two identical sets each comprising a chain (18) for carrying the filters (14; 52) and three sprockets (20) engaged with the chain (18).

2. The apparatus according to claim 1 wherein the primary filtering portion (28) extends substantially horizontally in the water.

3. The apparatus according to claim 2 wherein each of the filters (14) comprises a buoy (34) on the secondary filtering portion (30) in order to make the primary filtering portion (28) extend substantially horizontally while traveling in the water.

4. The apparatus according to claim 2 wherein the secondary filtering portion (30) extends substantially vertically in the water.

5. The apparatus according to claim 1 wherein the primary filtering portion (28) comprises a screen (24) supported on a frame.

6. The apparatus according to claim 1 wherein the secondary filtering portion (30) comprises a screen (26) supported on a frame.

7. The apparatus according to claim 1 wherein each of the filters (14) comprises two pins (38) each on one of to walls (36) for insertion in one of the chains (18).

8. The apparatus according to claim 1 comprising a dumping device (16) for dumping the solids from the primary filtering portion (28).

9. The apparatus according to claim 8 wherein the dumping device (16) comprises a rod (40) for turning the primary filtering portion (28) upside down.

10. The apparatus according to claim 9 wherein the dumping device (16) comprises a ram (42) for impinging the primary filtering portion (28) soon after the latter leaves the rod (40).

11. The apparatus according to claim 10 wherein the dumping device (16) comprises an elastic beam (44) for supporting the ram (42).

12. The apparatus according to claim 10 wherein the dumping device (16) comprises a nozzle (46) for spraying fluid in order to force the solids from the primary filtering portion (28).

13. The apparatus according to claim 10 wherein the dumping device (16) comprises a conveyor (48) for receiving the solids.

* * * * *